July 15, 1969  G. W. ROBERTSON  3,456,107

WATER STERILIZING APPARATUS

Filed May 16, 1967  2 Sheets-Sheet 1

INVENTOR
GORDON W. ROBERTSON
BY
Fetherstonhaugh & Co.
ATTORNEYS

July 15, 1969 G. W. ROBERTSON 3,456,107
WATER STERILIZING APPARATUS
Filed May 16, 1967 2 Sheets-Sheet 2

INVENTOR
GORDON W. ROBERTSON
BY
*Fetherstonhaugh & Co.*
ATTORNEYS

United States Patent Office 3,456,107
Patented July 15, 1969

3,456,107
WATER STERILIZING APPARATUS
Gordon W. Robertson, Vancouver, British Columbia, Canada, assignor to Aquacare International Ltd., Vancouver, British Columbia, Canada
Filed May 16, 1967, Ser. No. 638,904
Int. Cl. G01n 21/26
U.S. Cl. 250—43　　　　　　　　　　9 Claims

ABSTRACT OF THE DISCLOSURE

Ultra-violet ray water sterilizing apparatus having an elongated cylindrical chamber and an elongated ultra-violet ray lamp extending coaxially therethrough. A lamp cleaning member is slidably mounted on the lamp for movement therealong from one end to the other of the chamber by water passing through the chamber the buoyancy of said cleaning member being such that it moves back to said one end of the chamber when the water stops moving. The water enters the chamber tangentially forming an inner vortex adjacent to the lamp surface moving countercurrent to the direction of net-water flow and an outer vortex adjacent to the inner surface of the chamber wall, said inner vortex facilitating the movement of the cleaning member as flow is initiated.

Background of the invention

This invention relates to ultra-violet ray water purification devices and in particular to a lamp cleaning device and tube sealing apparatus.

The employment of ultra-violet ray lamps for sterilizing water is well known and apparatus has heretofore been developed which generally takes the form of a chamber through which water is passed to flow over an ultra-violet ray lamp mounted in the chamber. It has been found that during the operation of the lamp foreign matter, such as particles normally suspended in the water and calcium, tends to collect on the outer surface of the glass envelope of the lamp forming a coating which markedly reduces the intensity of rays of ultra-violet light which pass from the lamp into the water and which, consequently, reduces the efficiency of the lamp to a point where the germicidal rays of the lamp are largely ineffective.

It is appreciated that certain devices have heretofore been designed for automatically cleaning the lamp as water passes through the sterilizing apparatus. However, these cleaning devices have not in the main been entirely successful as they have usually employed cleaning elements extending the length of the lamp to be cleaned between the source of the ultraviolet rays and the water to be sterilized. This can result in insufficient sterilizing of some of the water that passes through the sterilizing apparatus.

Summary of the invention

It is an object of this invention to provide ultra-violet ray sterilizing apparatus having an ultra-violet ray lamp cleaning device which automatically, under the action of the water in the apparatus, moves back and forth longitudinally of the lamp to clean the latter. It is also an object of this invention to provide an automatic lamp cleaning device which will automatically, under the action of water flowing through the apparatus, move in the opposite direction to the general direction of flow of the water. It is a further object of this invention to provide an ultra-violet ray water sterilizing apparatus in which the ultra-violet ray lamp may be easily and quickly removed and replaced.

The present invention attains these objects by providing an elongated cylindrical sterilizing chamber adapted to be arranged in a vertical position, an elongated ultra-violet ray lamp extending through the chamber coaxially thereof and spaced from the wall of the latter to form an annular passage in the chamber, an outlet port in the wall of the chamber adjacent one end thereof, an inlet port at the other end of the chamber for directing water tangentially into the passage so as to form an outer vortex moving along the wall of the chamber towards said one end and an inner vortex moving along the lamp in the opposite direction, and a lamp cleaning member slidably and rotatably embracing the lamp for longitudinal movement from one end to the other of the latter, said lamp cleaning member being formed of a material having a buoyancy which will result in the cleaning member moving towards the said one end of the chamber when the flow of water therethrough is stopped, said cleaning member being adapted to be rotatably and slidably moved, by the water in the inner vortex, towards the other end of the chamber when the water is permitted to pass therethrough.

Description of the preferred embodiment

Figure 1:
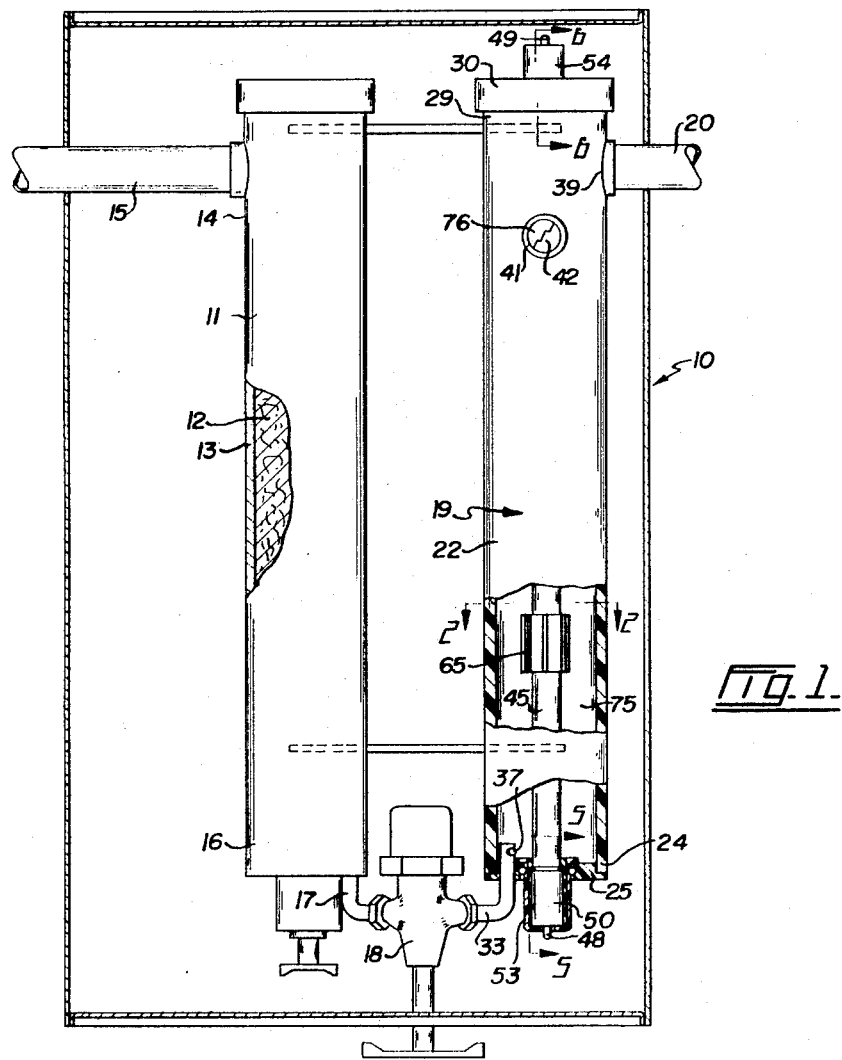
FIGURE 1 is a side elevation of the sterilizing apparatus, with portions thereof removed for purposes of clarity.

Referring to the drawings, the numeral 10 refers generally to a water filtering and sterilizing apparatus through which the water to be filtered and sterilized flows. The apparatus (refer to FIGURE 1) includes an elongated filtration assembly 11 employing a cellular filter 12 in a casing 13. Water to be purified is passed, under pressure, into one end 14 of the casing 13 via a conduit 15 and passes out of its outer end 16 via a conduit 17 through a solenoid controlled valve 18 and into a water sterilizing device generally accorded the numeral 19 from which it emerges via a conduit 20 filtered and sterilized.

The sterilizing device 19 (refer to FIGURE 1), embodying the invention, includes an elongated cylindrical chamber or casing 22 of relatively large cross section and which is formed of a non-corrosive material, such as a thermoplastic. However, it may be formed of a metal such as aluminium if desired. The casing is partially closed at one end 24 by an annular closure member plug 25 having a central bore 27 and is partially closed at its other end 29 by an internally threaded annular closure member cap 30 having a central bore 31, the walls of the bore 31 being provided with an internal annular groove 32.

Figure 2:
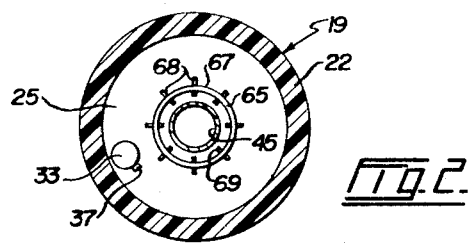
FIGURE 2 is an enlarged sectional view of the apparatus taken along line 2—2 of FIGURE 1.
Figure 3:
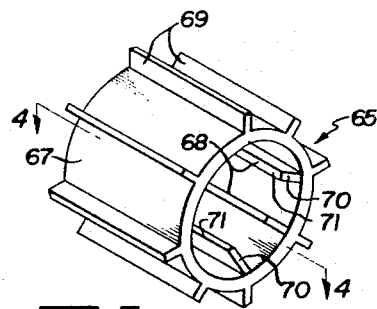
FIGURE 3 is an enlarged isometric view of the lamp cleaner of the invention.
Figure 4:
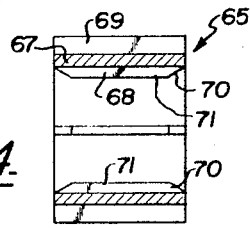
FIGURE 4 is a sectional view taken in the direction 4—4 of FIGURE 3.
Figure 5:
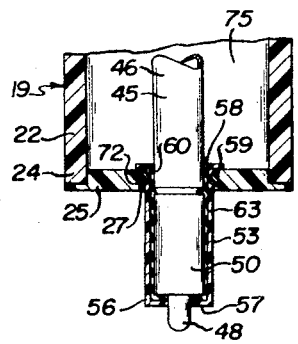
FIGURE 5 is a scetional view taken along line 5—5 of FIGURE 1.
Figure 6:
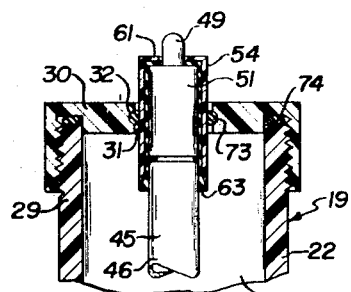
FIGURE 6 is a sectional view of the invention taken along line 6—6 of FIGURE 1.

The casing is connected at its end 24 by means of a pipe fitting 33 to the valve 18. This pipe fitting 33 (refer to FIGURES 1 and 2) extends through the annular plug 25 off-centre of the central bore 27 and has a laterally extending nozzle or port 37 directed so as to direct water into the casing substantially tangentially thereof. An outlet port 39 is formed in the wall of the casing near, but spaced from, the end 29 of the latter, an external sleeve connector being secured to the casing over the port 39 to provide a connection with the conduit 20. A small aperture 41 is formed in the wall of the casing adjacent the port 39 and a quartz lens 42 is sealably fitted therein.

The device 19 also includes a conventional ultra-violet ray lamp 45 extending through casing 22, the lamp having an elongated cylindrical small diameter sealed quartz glass envelope 46 having end contact lugs 48 and 49. This type of lamp is usually fitted with end protectors 50 and 51 which take the form of short tubular sleeves having the same diameter as the envelope 46. The lamp is a little longer than the casing 22 and the diameter of the glass envelope 46 is much smaller than the inside diameter of the casing (preferably one-quarter of the latter) and the outside diameter of the protectors 50 and 51 and envelope 46 is substantially less than the diameter of the central bores 27 and 31 of the plug 25 and the cap 30, respectively.

The device 19 includes short cylindrical sleeves or socket members 53 and 54 which fit over the lamp protectors 50 and 51, respectively. The inside diameter of the sleeves is a little larger than the outside diameter of their associated protectors and their outside diameter is a little less than the diameter of the central bores 27 and 31.

Sleeves 53 has at one end 56 an inner annular flange 57 and at the other end 58 an outer annular flange 59, both flanges being formed as an integral part of the sleeve. The sleeve 53 is also provided with an outer annular groove 60 adjacent the flange 59. Sleeve 54 is substantially the same as sleeve 53 having an inner annular flange 61 at one end but does not have at its opposite end an outer annular flange corresponding to flange 59 of sleeve 53. These sleeves are fitted over their associated protectors 50 and 51 with the lugs 48 and 49 extending through the annular flanges 57 and 61, respectively. In order to effect a fluid tight seal between the sleeves and their associated protectors, a fluid-type sealant 63 which sets to a rubber-like consistency upon exposure to air and which may be chosen from a number of types now available, is first spread around the interior of the sleeves 53 and 54 before the latter are fitted over their respective lamp protectors.

The sterilizing device 19 also includes a lamp cleaning member 65. This cleaning member (refer to FIGURES 1 to 4) consists of a short cylindrical sleeve 67 having a plurality of longitudinally extending cleaning fins 68 extending radially inwardly of its inner surface and a plurality of longitudinally extending vanes 69 extending radially outwardly from its outer surface. The fins 68 are chamfered at their ends 70 and their tips 71 lie on the circumference of an imaginary circle having a diameter slightly greater than the diameter of the lamp 45. The fins 68 and vanes 69, although extending the full length of the sleeve 67, are relatively narrow, measured radially, so that the total diameter of the cleaning member as measured between the tips of opposite vanes is approximately one and one half times the diameter of the lamp. This cleaning member is formed of a water buoyant material, it being preferred to use a thermoplastic, such as polyethylene which is non-corrosive and which permits the sleeve, vanes and fins to be molded as an integral unit.

In assembling the device 19, the cleaning member 65 is positioned over the lamp 45, the sleeves 53 and 54 then applied and a rubber O-ring 72 fitted into the annular groove 60 of sleeve 53. The lamp is then inserted into the open end 29 of the casing, and sleeve 53 inserted through the central bore 27 with the annular flange 59 seated against the plug 25 and with the O-ring 72 compressed between the sleeve 53 and the wall of said central bore 27. A rubber O-ring 73 is then fitted in groove 32 in the annular cap 30 and the cap then fitted over the sleeve 54 and turned down against an O-ring 74 fitted between said cap and the end 29 of the casing. The lamp is supported coaxially of the casing 22 and in view of the disparity in diameters of said lamp and casing, there is formed an annular passage 75 of relatively large cross sectional area for the passage of water from the nozzle or port 37 to the outlet port 39. The provision of the O-ring fitted sleeve 53 and sleeve 54, together with the removable cap 30, permits easy and quick lamp replacement yet results in a tight fluid seal of the lamp and casing as the O-rings 72 and 73 tend to expand under the pressure of water and thus create a positive seal which increases as water pressure increases. The device as described automatically corrects for misalignment of the protectors 50 and 51 and for undue deviation in length of lamp. In addition no special tools are required for lamp replacement as the provision of the O-ring 73 to obtain a seal permits the cap 30 to be easily tightened or removed by hand.

Apparatus 10 also includes, but not forming part of the invention, an ultra-violet ray detector 76 which, in conjunction with the solenoid operated valve 18, is arranged to shut off the flow of water to the device 19 when the ultra-violet radiation measured at the lens 42 falls below a predetermined level. This detector 76 may be one of any of the well-known types normally used for measuring ultra-violet ray intensity and it is therefore deemed unnecessary to describe it further or describe its operational connection with the solenoid valve 18 as the operational characteristics and use of this type of measuring device and its manner of use is well known.

The design of apparatus 10 makes it eminently suitable for use in households and the like where intermittent flow of water is to be expected. The apparatus is mounted in an easily accessible location with the cylindrical casing 22 of the device 19 in an upright position so that water will flow from the inlet port 37 upwardly to the outlet port 39. The conduit 15 is connected to a pressurized source of water to be sterilized. Conduit 20 is connected to faucet controlled household lines, not shown, and the lamp connected via the electrical contact lugs 48 and 49 to a suitable source of electric power. The lamp is continuously operated so that any water passing through the casing between the inlet port and outlet port thereof is thoroughly sterilized, the relatively large cross sectional area of the casing permitting relatively slow longitudinal movement of the water therethrough so that its exposure to the germicidal action of the ultra-violet rays is extended.

Without the provision of a cleaner, calcium and other foreign material carried into the casing by the water, would be deposited upon the glass envelope due to continuous operation and would gradually result in the glass envelope becoming opaque, thereby reducing the intensity of the ultra-violet emanations of the lamp below the level at which the solenoid valve 18, as controlled by the detector 76, would permit the flow of water to continue. It would ordinarily therefore be necessary to remove the lamp in order to clean it of the deposited material thereon. The provision of cleaning member 65, however, eliminates this manual cleaning operation as the cleaning member operates automatically to clean the lamp each time the faucet controlled conduit 20 is opened or closed to the passage of water therethrough.

Figure 7:
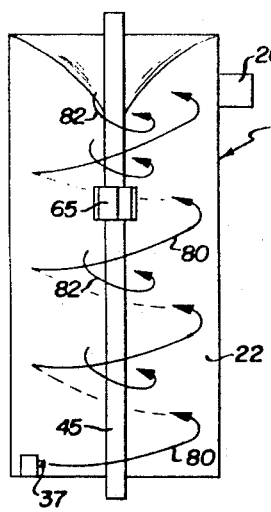
FIGURE 7 is a diagrammatic representation of the apparatus illustrating the flow of water therethrough and the operation of the lamp cleaner.

The action of the cleaning member 65 can best be described with reference to the diagrammatic representation of the water-filled device 19 as illustrated in FIGURE 7. The cleaning member, being buoyant, will normally rise to the surface of the water in the device 19 under non-flow conditions. However, when the faucet controlled conduit 20 is opened, water will enter the chamber through the nozzle or port 37, and as it is directed tangentially of the casing will cause the entire body of water in the casing 22 to rotate, resulting in the formation of an outer vortex (arrows 80) moving upwardly along the casing wall and an inner vortex (arrows 82) moving downwardly over the lamp and the cleaning member. The inner vortex thus formed causes the cleaner to spin violently and at the same time draws it down the lamp to the bottom of the casing and holds it there until the water flow is again interrupted. When the flow ceases, the cleaner will again float to the top. On the way down the lamp, due to the slightly loose fit of the cleaning member thereon, the latter will wobble as it spins providing a complete scouring action of the quartz glass envelope.

Although, as herebefore pointed out, the apparatus is eminently suitable for use in circumstances where intermittent flow of water is to be expected, it may quite successfully be used when a more constant flow of water is required. In the latter situation, it is only necessary to connect a plurality of apparatus 10 in parallelism and with the use of suitable valves, either manually or automatically controlled, intermittently shut off the flow of water to one or more of each said apparatus so as to permit the cleaning member in each apparatus to perform its proper function.

Although, as heretofore described, the cleaning member has a positive buoyancy, the device 19 may be fitted with a cleaning member having a slight negative buoyancy. In this case it is only necessary to reverse the position of the ports 37 and 39 so that the water enters at the top of casing 22 and exits at the bottom thereof. The cleaning member will normally gravitate to the bottom of casing 22 under non-flow conditions and will spin to the top thereof when water is again permitted to flow.

I claim:

1. Water sterilizing apparatus comprising an elongated cylindrical sterilizing chamber adapted to be arranged in a vertical position, an elongated ultra-violet ray lamp extending through the chamber coaxially thereof and spaced from the wall of the latter, an outlet port in the wall of the chamber adjacent one end of the latter, an inlet port at the other end of the chamber for discharging water tangentially thereinto so as to form an outer vortex moving along the wall of the chamber towards said one end and an inner vortex moving along the lamp in the opposite direction, and a lamp cleaning member slidably and rotatably embracing the lamp for longitudinal movement from one end to the other of the latter, said lamp cleaning member being formed of a material having a buoyancy which will result in the cleaner moving towards the said one end of the chamber when the flow of water therethrough is stopped, said cleaning member being adapted to be rotatably and slidably moved, by the water in the inner vortex, towards the other end of the chamber when the water is permitted to pass therethrough.

2. Water sterilizing apparatus comprising an elongated cylindrical sterilizing chamber adapted to be arranged in a vertical position, an elongated ultra-violet ray lamp extending through the chamber coaxially thereof and spaced from the wall of the latter, an outlet port in the wall of the chamber adjacent the upper end of the latter, an inlet port at the lower end of the chamber for discharging water tangentially thereinto so as to form an outer vortex moving upwardly along the chamber wall and an inner vortex passing downwardly over the lamp, a water-buoyant lamp cleaning member being adapted to slidably and rotatably embrace the lamp so as to normally float to the surface of water in the chamber when the flow of water therethrough is stopped and to be slidably and rotatably moved, by the water in the inner vortex, downwardly over the lamp when water is permitted to flow through the chamber.

3. Water sterilizing apparatus as claimed in claim 2 in which the cleaning member comprises a short cylindrical sleeve element having interior longitudinally extending fins for slidably and rotatably engaging the lamp and exterior longitudinally extending vanes adapted to extend into the inner vortex.

4. Water sterilizing apparatus as claimed in claim 2 in which the cleaning member is formed of a thermoplastic material having a density less than the density of water.

5. Water sterilizing apparatus comprising an elongated casing adapted to be arranged in a vertical position, an elongated ultra-violet lamp extending through and axially disposed relative to the casing and being spaced from the walls of the latter, cylindrical socket members sealably fitted to the ends of the lamp, a closure member at each end of the casing into and through which the socket members extend, resilient annular sealing means interposed under compression between each closure member and the socket member extending therethrough, outlet port means associated with one end of the casing, inlet port means associated with the other end of the casing arranged to discharge water tangentially thereinto so as to form an outer vortex moving along the walls of the casing towards said one end and an inner vortex moving along the lamp in the opposite direction, and a lamp cleaning member slidably and rotatably embracing the lamp for longitudinal movement from one end to the other of the latter, said lamp cleaning member being formed of a material having a buoyancy which will result in the cleaning member gravitating towards the said one end of the casing when the flow of water therethrough is stopped, said cleaning member being adapted to be rotatably and slidably moved, by the water in the inner vortex, towards the other end of the casing when the water is permitted to pass therethrough.

6. Water sterilizing apparatus as claimed in claim 5 in which the casing is arranged with the outlet port uppermost, said lamp cleaning member having positive buoyancy so as to float to the top of the water in the casing when the flow of water therethrough is stopped.

7. Water sterilizing apparatus as claimed in claim 5 in which the resilient annular sealing means comprises a rubber O-ring.

8. Water sterilizing apparatus as claimed in claim 5 in which one of the closure members is releasably connected to the casing.

9. Water sterilizing apparatus as claimed in claim 8 in which one of the socket members is provided with an exterior annular flange engageable with the other of said closure members.

References Cited

UNITED STATES PATENTS

| 2,501,290 | 3/1950 | Pequignot | 250—48 |
|---|---|---|---|
| 3,061,721 | 10/1962 | Brenner. | |
| 3,138,708 | 6/1964 | Ellner et al. | 250—46 |
| 3,182,191 | 5/1965 | McFarland et al. | 250—43 |
| 3,182,193 | 5/1965 | Ellner et al. | 21—102 XR |
| 3,336,099 | 8/1967 | Czulak et al. | 21—102 |

MORRIS O. WOLK, Primary Examiner

BARRY S. RICHMAN, Assistant Examiner

U.S. Cl. X.R.

21—102; 250—46, 48